US012633630B2

(12) United States Patent
Liang et al.

(10) Patent No.: US 12,633,630 B2
(45) Date of Patent: May 19, 2026

(54) BATTERY MODULE, AND ELECTRIC APPARATUS POWERED BY THE BATTERY MODULE

(71) Applicant: CONTEMPORARY AMPEREX TECHNOLOGY (HONG KONG) LIMITED, Hong Kong (CN)

(72) Inventors: Changqing Liang, Ningde (CN); Xiaobo Chen, Ningde (CN); Xuehui Wang, Ningde (CN); Liangmei Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 468 days.

(21) Appl. No.: 18/322,246

(22) Filed: May 23, 2023

(65) Prior Publication Data

US 2023/0299440 A1 Sep. 21, 2023

Related U.S. Application Data

(63) Continuation of application No. PCT/CN2022/075233, filed on Jan. 30, 2022.

(30) Foreign Application Priority Data

Apr. 30, 2021 (CN) .......................... 202120925863.5

(51) Int. Cl.
*H01M 50/588* (2021.01)
*H01M 50/209* (2021.01)
(Continued)

(52) U.S. Cl.
CPC ....... *H01M 50/588* (2021.01); *H01M 50/209* (2021.01); *H01M 50/264* (2021.01); *H01M 50/3425* (2021.01)

(58) Field of Classification Search
CPC ............ H01M 50/588; H01M 50/209; H01M 50/264; H01M 50/3425
See application file for complete search history.

(56) References Cited

U.S. PATENT DOCUMENTS

2012/0171527 A1 7/2012 Hiroma
2017/0358785 A1* 12/2017 Hattori ................ H01M 50/264
2022/0123406 A1 4/2022 Yu et al.

FOREIGN PATENT DOCUMENTS

CN 203631621 U 6/2014
CN 205882030 U 1/2017
(Continued)

OTHER PUBLICATIONS

International Search Report for PCT Application No. PCT/CN2022/075233, mailed Apr. 28, 2022.
(Continued)

*Primary Examiner* — Jimmy Vo
(74) *Attorney, Agent, or Firm* — Ladas & Parry LLP

(57) ABSTRACT

A battery includes a plurality of battery cells arranged in a first direction. The battery cell includes a first wall and a second wall that intersect, the first wall is provided with a pressure relief mechanism, and a protective member is disposed between the second wall and an inner wall of a box. The pressure relief mechanism and the protective member are disposed on two different walls of the battery cell respectively. When emissions produced by thermal runaway of the battery are discharged from the pressure relief mechanism disposed on the first wall, if some emissions fall between the second wall of the battery cell and the inner wall of the box, under the protective effect of the protective member, electrical connection between the second wall of the battery cell and the inner wall of the box can be effectively avoided, thereby reducing the risk of short circuit.

13 Claims, 4 Drawing Sheets

(51) Int. Cl.
   *H01M 50/264* (2021.01)
   *H01M 50/342* (2021.01)

(56) References Cited

FOREIGN PATENT DOCUMENTS

| | | | | | |
|---|---|---|---|---|---|
| CN | 107403894 | A | | 11/2017 | |
| CN | 107408646 | A | * | 11/2017 | .............. B60L 58/21 |
| CN | 107508012 | A | * | 12/2017 | ........ H01M 10/6554 |
| CN | 207818738 | U | | 9/2018 | |
| CN | 109004111 | A | * | 12/2018 | ........... H01M 50/10 |
| CN | 209730030 | U | | 12/2019 | |
| CN | 111435720 | A | | 7/2020 | |
| CN | 211828880 | U | | 10/2020 | |
| CN | 112331963 | A | | 2/2021 | |
| CN | 112585807 | A | | 3/2021 | |
| CN | 214589152 | U | | 11/2021 | |
| JP | 2011134699 | A | | 7/2011 | |
| JP | 2018060595 | A | | 4/2018 | |
| JP | 2019016501 | A | | 1/2019 | |
| JP | 2020113458 | A | | 7/2020 | |
| WO | 2012133711 | A1 | | 10/2012 | |
| WO | 2015125223 | A1 | | 8/2015 | |
| WO | 2016136248 | A1 | | 9/2016 | |

OTHER PUBLICATIONS

Written Opinion of International Search Authority for PCT Application No. PCT/CN2022/075233, mailed Apr. 28, 2022.
Extended European Search Report for EP application No. 22794255.4, dated Jun. 11, 2024.
Notice of Reasons for Refusal, JP Application No. 2023-503469, dated Feb. 26, 2024.

\* cited by examiner

BATTERY MODULE, AND ELECTRIC APPARATUS POWERED BY THE BATTERY MODULE

CROSS REFERENCE TO RELATED APPLICATIONS

This application is a continuation of International Patent Application No. PCT/CN2022/075233, filed on Jan. 30, 2022, which claims priority to Chinese Patent Application No. 202120925863.5, filed on Apr. 30, 2021. These patent applications are incorporated herein by reference in their entirety.

TECHNICAL FIELD

Embodiments of this application relate to the field of electric vehicle battery safety technologies, and in particular, to a battery and an electric apparatus.

BACKGROUND

Energy conservation and emission reduction are crucial to sustainable development of the automobile industry. In this context, electric vehicles, with their advantages in energy conservation and environmental protection, have become an important part of sustainable development of the automobile industry. For electric vehicles, battery technology is an important factor in connection with their development.

In the development of battery technology, in addition to performance improvement, safety is another non-negligible issue. If the safety of a battery cannot be guaranteed, the battery cannot be used. Therefore, how safety performance of batteries is enhanced is an urgent technical problem that needs to be solved in battery technology.

SUMMARY

In view of the foregoing issue, embodiments of this application provide a battery and an electric apparatus to effectively enhance safety performance of batteries.

According to an aspect of the embodiments of this application, a battery is provided, including a plurality of battery cells, a box, and a protective member. The plurality of battery cells are arranged in a first direction, where the battery cell includes a first wall and a second wall that intersect, the first wall is provided with a pressure relief mechanism, and the pressure relief mechanism is configured to be actuated when internal pressure or temperature of the battery cell reaches a threshold, so as to relieve the internal pressure of the battery cell. The box is configured to accommodate the plurality of battery cells. The protective member is disposed between the second wall of the battery cell and an inner wall of the box, where the protective member is configured to prevent emissions from the battery cell from causing electrical connection between the second wall of the battery cell and the inner wall of the box when the pressure relief mechanism is actuated.

In the embodiments of this application, the pressure relief mechanism and the protective member are disposed on two different walls of the battery cell respectively. When emissions produced by thermal runaway of the battery are discharged from the pressure relief mechanism disposed on the first wall, if some emissions fall between the second wall of the battery cell and the inner wall of the box, under the protective effect of the protective member, electrical connection between the second wall of the battery cell and the inner wall of the box can be effectively avoided, thereby reducing the risk of short circuit and improving use safety of the battery.

Optionally, the protective member is fastened to the second wall of the battery cell and/or the inner wall of the box.

In the embodiments of this application, the protective member may be disposed only on the second wall of the battery cell, or only on the inner wall of the box, or on both the second wall of the battery cell and the inner wall of the box. The protective member can be disposed in various manners, and when the protective member is disposed on both the second wall of the battery cell and the inner wall of the box, the protective effect is better.

Optionally, the protective member is bonded to the second wall of the battery cell and/or the inner wall of the box.

Optionally, the battery further includes a fastening band, where the fastening band is disposed around the periphery of the plurality of battery cells, and the fastening band is configured to fasten the protective member to the second wall of the battery cell.

In the embodiments of this application, the protective member may be fastened to the inner wall of the box by bonding. The protective member may be fastened to the second wall of the battery cell by bonding or by using a fastening band which is disposed around the periphery of the plurality of battery cells. Such fastening manners are simple and easy to operate.

Optionally, the protective member includes a first protective member and a second protective member that are separated, where the first protective member is configured to be fixedly connected to the second wall of the battery cell, and the second protective member is configured to be fixedly connected to the inner wall of the box.

In the embodiments of this application, the protective member may be disposed on both the second wall of the battery cell and the inner wall of the box. Based on this, the first protective member may be disposed on the second wall of the battery cell, and the second protective member may be disposed on the inner wall of the box. Under the protective effect of the first protective member and the second protective member, electrical connection between the second wall of the battery cell and the inner wall of the box can be effectively avoided, thereby reducing the risk of short circuit and improving use safety of the battery. In addition, the first protective member and the second protective member being separated makes their arrangement more flexible and diversified.

Optionally, the protective member is an insulation coating layer applied onto the second wall of the battery cell and/or the inner wall of the box.

In the embodiments of this application, the protective member in this application is disposed between the second wall of the battery cell and the inner wall of the box, not on the first wall where the pressure relief mechanism is located, so that the emissions do not directly impact the protective member. Therefore, the protective member may be thick and may be an insulation coating layer applied onto the second wall of the battery cell or the inner wall of the box. The coating manner is simple. Therefore, this application can improve operability of disposing the protective member.

Optionally, the box is provided with a structural beam, where the structural beam is configured to separate an inner space of the box into a plurality of accommodating cavities, each of the accommodating cavities is configured to accommodate at least one battery cell, and the protective member is disposed between the second wall of the battery cell and a cavity wall of the accommodating cavity.

In the embodiments of this application, the protective member may be further disposed between the second wall of the battery cell and the cavity wall of the accommodating cavity. In this way, electrical connection between the second wall of the battery cell and the cavity wall of the accommodating cavity can be effectively avoided, thereby reducing the risk of short circuit and improving use safety of the battery.

Optionally, a thickness of the protective member is greater than or equal to 0.1 millimeter and less than or equal to 1 millimeter.

Optionally, a melting point of the protective member is higher than 100° C.

In the embodiments of this application, when the melting point of the protective member is higher than 100° C., electrical connection between the second wall of the battery cell and the inner wall of the box can be effectively avoided, thereby reducing the risk of short circuit and improving use safety of the battery.

Optionally, a size of the protective member in a second direction is greater than or equal to 2 millimeters and less than or equal to a size of the battery in the second direction, where the second direction is perpendicular to the first direction.

In the embodiments of this application, the size of the protective member in the second direction may be set as needed, allowing for diverse size designs.

Optionally, a distance between the second wall of the battery cell and the inner wall of the box is greater than 3 millimeters.

In the embodiments of this application, the distance between the second wall of the battery cell and the inner wall of the box is greater than 3 millimeters. This not only facilitates fastening of the battery cell inside the box, but also provides a large accommodating space for emissions produced by thermal runaway so that the emissions do not easily come into contact with the second wall of the battery cell and the inner wall of the box, thereby reducing the probability of electrical connection between the second wall of the battery cell and the inner wall of the box caused by the emissions and reducing the risk of short circuit.

Optionally, the battery further includes a binder for fastening the plurality of battery cells to the box, where at least part of the binder is located between the second wall of the battery cell and the inner wall of the box, so as to prevent emissions from the battery cell from causing electrical connection between the second wall of the battery cell and the inner wall of the box.

Optionally, a thickness of the at least part of the binder located between the second wall of the battery cell and the inner wall of the box is greater than 2 millimeters.

In the embodiments of this application, the binder can fasten the battery cell to the box. In addition, when the binder overflowing between the second wall of the battery cell and the inner wall of the box is thick enough, such binder can prevent electrical connection between the second wall of the battery cell and the inner wall of the box.

According to another aspect of the embodiments of this application, an electric apparatus is provided. The electric apparatus includes the battery according to the first aspect, where the battery is configured to supply electric energy.

In the embodiments of this application, a first wall of a plurality of battery cells is provided with a pressure relief mechanism, and a protective member is disposed between a second wall of the plurality of battery cells and an inner wall of a box, where the first wall and the second wall of the plurality of battery cells intersect. In other words, in the embodiments of this application, the pressure relief mechanism and the protective member are disposed on two different walls of the battery cell respectively. In this way, when emissions produced by thermal runaway of the battery are discharged from the pressure relief mechanism disposed on the first wall, if some emissions fall between the second wall of the battery cell and the inner wall of the box, under the protective effect of the protective member, electrical connection between the second wall of the battery cell and the inner wall of the box can be effectively avoided, thereby reducing the risk of short circuit and improving use safety of the battery.

The foregoing description is merely an overview of the technical solutions in the embodiments of this application. In order to better understand the technical means in the embodiments of this application, to achieve implementation according to content of the specification, and to make the above and other objects, features and advantages in the embodiments of this application more obvious and easy to understand, the following describes specific embodiments of this application.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and persons of ordinary skill in the art may still derive other drawings from these accompanying drawings without creative efforts.

REFERENCE SIGNS

Figure 1:
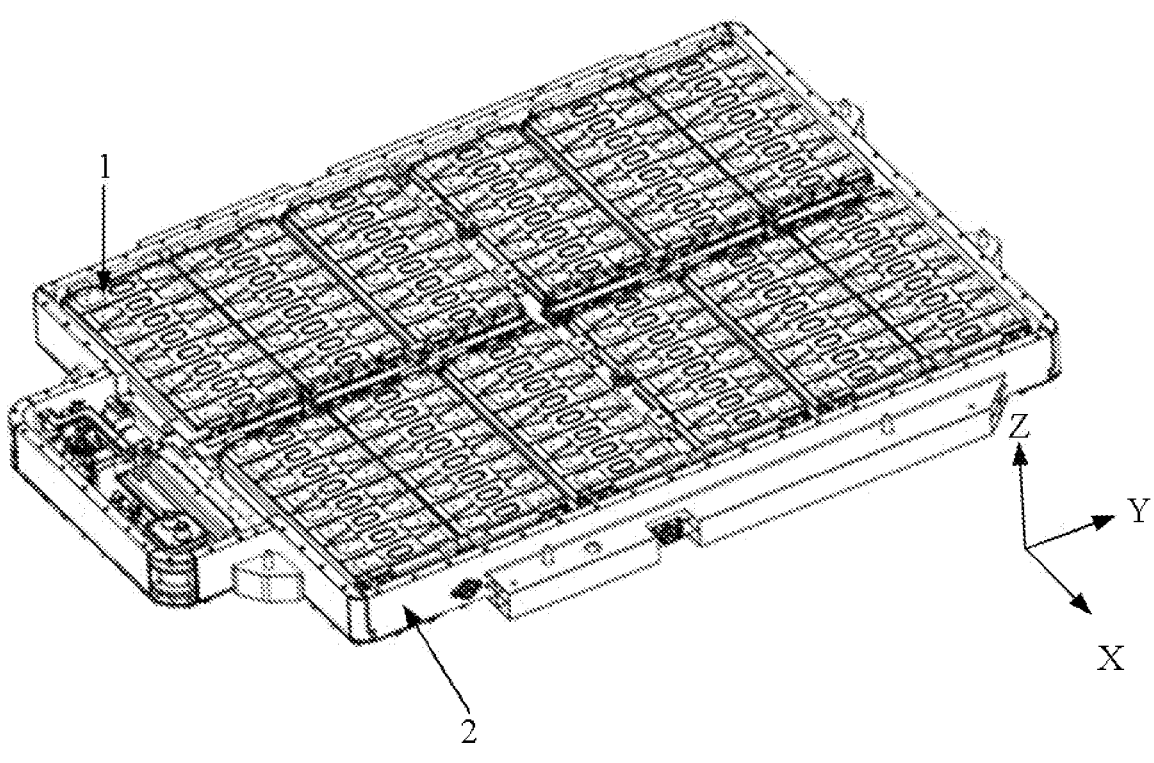
FIG. 1 is a schematic structural diagram of a battery according to an embodiment of this application.

1. battery cell,
2. box,
3. protective member,
4. fastening band,
11. first wall,
12. second wall,
13. top cover assembly,
21. structural beam,
111. pressure relief mechanism,
X. first direction,
Y. third direction, and
Z. second direction.

DETAILED DESCRIPTION

To make the objectives, technical solutions, and advantages of the embodiments of this application clearer, the following clearly and completely describes the technical solutions in the embodiments of this application with reference to the accompanying drawings in the embodiments of this application. Apparently, the described embodiments are some but not all of the embodiments of this application. All other embodiments obtained by persons of ordinary skill in the art based on the embodiments of this application without creative efforts shall fall within the protection scope of this application.

Unless otherwise defined, meanings of all technical and scientific terms used in this specification are the same as those commonly understood by persons skilled in the art of this application. The terms used in this specification of this application are merely intended to describe specific embodiments, but not to limit this application.

The terms "comprise", "include", and any variants thereof in the descriptions of the specification, claims, and accompanying drawings of this application are intended to cover a non-exclusive inclusion. The word "a" or "an" does not exclude existence of more than one.

In this specification, reference to "embodiment" means that specific features, structures, or characteristics described with reference to the embodiment may be incorporated in at least one embodiment of this application. The word "embodiment" appearing in various places in the specification does not necessarily refer to the same embodiment or an independent or alternative embodiment that is exclusive of other embodiments. It is explicitly or implicitly understood by persons skilled in the art that the embodiments described herein may be combined with other embodiments.

The term "and/or" in this specification is only an associative relationship for describing associated objects, indicating that three relationships may be present. For example, A and/or B may indicate three cases: presence of only A; presence of both A and B; and presence of only B. In addition, the character "/" in this specification generally indicates an "or" relationship between contextually associated objects.

The orientation terms appearing in the following description all refer to the orientations as shown in the drawings, and do not limit the specific structure of the battery and the electric apparatus in this application. For example, in the descriptions of this application, the orientations or positional relationships indicated by the terms "center", "longitudinal", "transverse", "length", "width", "thickness", "upper", "lower", "front", "rear", "left", "right", "perpendicular", "horizontal", "top", "bottom", "inside", "outside", "clockwise", "counterclockwise", "axial", "radial", "circumferential", and the like are based on the orientations or positional relationships as shown in the accompanying drawings. These terms are merely for ease and brevity of descriptions of this application rather than indicating or implying that the apparatuses or components mentioned must have specific orientations or must be constructed or manipulated according to specific orientations, and therefore shall not be construed as any limitations on this application.

In addition, expressions such as the direction X, the direction Y, and the direction Z that are used to describe indication directions of operations and constructions of various members of the battery and the electric apparatus in the embodiments are relative rather than absolute. Although these indications are appropriate when the members of the battery are located at the positions shown in the figures, these directions shall be interpreted differently when the positions change, to reflect the changes.

In addition, in the specification, claims, or accompanying drawings of this application, the terms "first", "second", and the like are intended to distinguish between different objects rather than to indicate a particular order, and can explicitly or implicitly include one or more features.

In the descriptions of this application, unless otherwise specified, the term "a plurality of" means more than two (inclusive). Similarly, "a plurality of groups" means more than two (inclusive) groups.

In the descriptions of this application, it should be noted that, unless otherwise specified and defined explicitly, the terms "installed", "connected", and "connection" should be understood broadly. For example, "connected" or "connection" of a mechanical structure may indicate physical connection. For example, the physical connection may be fixed connection, for example, fixed connection by using a fixing member such as a screw, a bolt, or other fixing members; or the physical connection may be detachable connection, for example, connection by mutual clamping or clamping; or the physical connection may be integral connection, for example, connection by welding, bonding, or integral forming. "Connected" or "connection" of a circuit structure may indicate physical connection, and may also indicate electrical connection or signal connection, for example, may be direct connection, that is, the physical connection, may be indirect connection by using at least one element in between as long as circuit communication is implemented, and may also be communication between two elements; and the signal connection may be signal connection by using a circuit, and may also be signal connection by using a medium, such as a radio wave. Persons of ordinary skill in the art can understand specific meanings of these terms in this application as appropriate to specific situations.

To reduce overall weight of a battery and bundle battery cells 1 into a pack, a structure without a side plate is generally used. To be specific, an outer side wall of the battery cell 1 is wrapped with an insulation film, and a fastening band 4 is used to bundle the plurality of battery cells 1 and an end plate assembly to form a battery module. Finally, a plurality of battery modules are fixedly connected to a box 2 to form a battery, so as to power an electric vehicle and the like.

However, when a cell in the box 2 experiences thermal runaway, high-temperature particles will be ejected. When the ejected high-temperature particles fall between a side wall of the battery cell 1 and an inner wall of the box 2, the insulation film coating the battery cell 1 is melted, such that the side wall of the battery cell 1 and the inner wall of the box 2 are electrically connected, resulting in a short circuit and further causing high voltage spark or even explosion.

In view of this, the embodiments of this application provide a battery, including: a plurality of battery cells 1 arranged in a first direction X, where the battery cell 1 includes a first wall 11 and a second wall 12 that intersect, the first wall 11 is provided with a pressure relief mechanism 111, and the pressure relief mechanism 111 is configured to be actuated when internal pressure or temperature of the battery cell 1 reaches a threshold, so as to relieve the internal pressure of the battery cell 1; a box 2 configured to accommodate the plurality of battery cells 1; and a protective member 3 disposed between the second wall 12 of the battery cell 1 and an inner wall of the box 2, where the protective member 3 is configured to prevent emissions from the battery cell 1 from causing electrical connection between the second wall 12 of the battery cell 1 and the inner wall of the box 2 when the pressure relief mechanism 111 is actuated.

In the embodiments of this application, the pressure relief mechanism 111 and the protective member 3 are disposed on two different walls of the battery cell 1 respectively. When emissions produced by thermal runaway of the battery are discharged from the pressure relief mechanism 111 disposed on the first wall 11, if some emissions fall between the second wall 12 of the battery cell 1 and the inner wall of the box 2, under the protective effect of the protective member 3, electrical connection between the second wall 12 of the battery cell 1 and the inner wall of the box 2 can be effectively avoided, thereby reducing the risk of short circuit and improving use safety of the battery.

The pressure relief mechanism 111 is a component or part that is actuated when the internal pressure or temperature of the battery cell 1 reaches a predetermined threshold, so as to relieve the internal pressure or temperature. The threshold may be adjusted according to different design requirements. The threshold may depend on the material used for one or more of a positive electrode plate, a negative electrode plate, an electrolyte, and a separator in the battery cell 1. The pressure relief mechanism 111 may be in a form of an explosion-proof valve, a gas valve, a pressure relief valve, a safety valve, or the like, and may specifically employ an element or a part sensitive to pressure or temperature. To be specific, when the internal pressure or temperature of the battery cell 1 reaches the predetermined threshold, the pressure relief mechanism 111 performs an action or a weak structure provided in the pressure relief mechanism 111 is destroyed, thereby forming an opening or a channel for relieving the internal pressure or temperature.

"Actuate" mentioned in this application means that the pressure relief mechanism 111 is put into action or is activated to a given state such that the internal pressure and temperature of the battery cell 1 are relieved. The action that the pressure relief mechanism 111 is put into may include but is not limited to, for example, cracking, breaking, tearing, or opening at least part of the pressure relief mechanism 111. When the pressure relief mechanism 111 is actuated, high-temperature and high-pressure substances inside the battery cell 1 are discharged as emissions from an actuated site. In this way, the battery cell 1 can relieve pressure and temperature under controllable pressure or temperature, thereby avoiding more serious potential incidents.

The emissions from the battery cell 1 mentioned in this application include but are not limited to electrolyte, fragments of positive and negative electrode plates and separator because of dissolution or breaking, and high-temperature and high-pressure gases and flames produced by reactions.

The embodiments of this application further provide an electric apparatus. The electric apparatus includes a body and a battery, where the battery is disposed in the body and used as a power source to supply electric energy to the electric apparatus.

The electric apparatus may be a vehicle, for example, a new energy vehicle. The new energy vehicle may be a battery electric vehicle, a hybrid electric vehicle, an extended-range electric vehicle, or the like. A vehicle body is provided with a drive motor. The drive motor is electrically connected to the battery, and is provided with electrical energy by the battery. The drive motor is connected to wheels on the vehicle body through a transmission mechanism to drive the vehicle. Alternatively, the electric apparatus may be an unmanned aerial vehicle, a ship, or the like.

Figure 2:
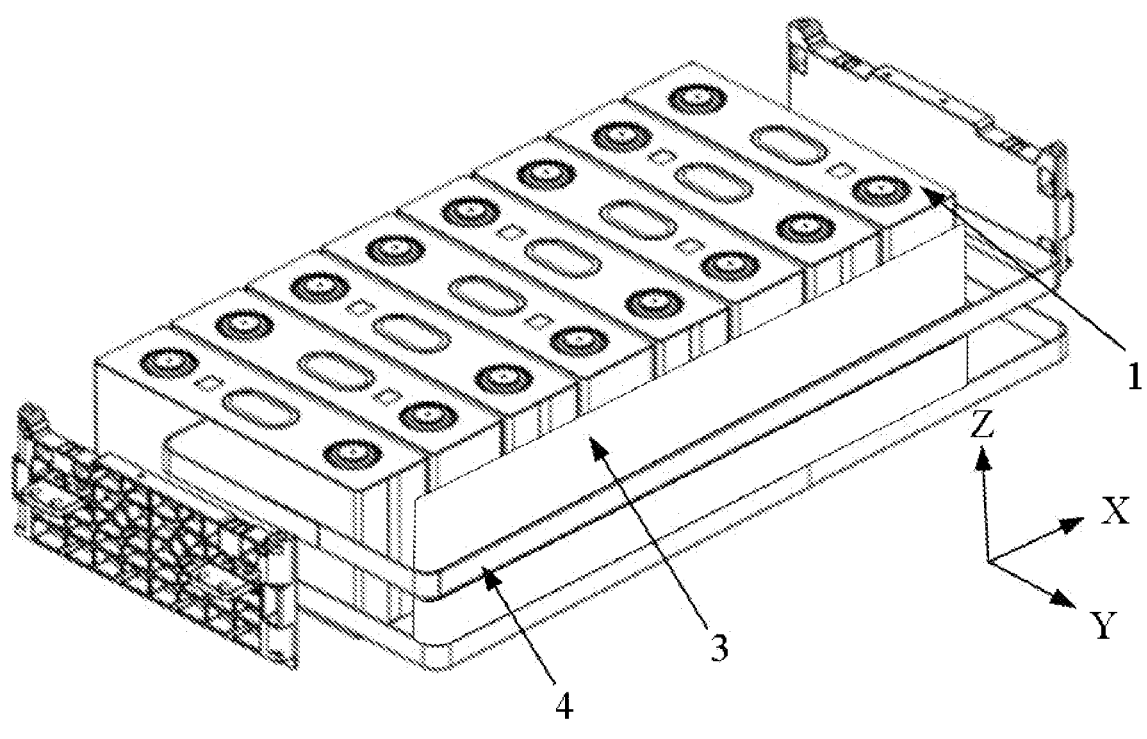
FIG. 2 is a schematic structural diagram of another battery according to an embodiment of this application.
Figure 3:
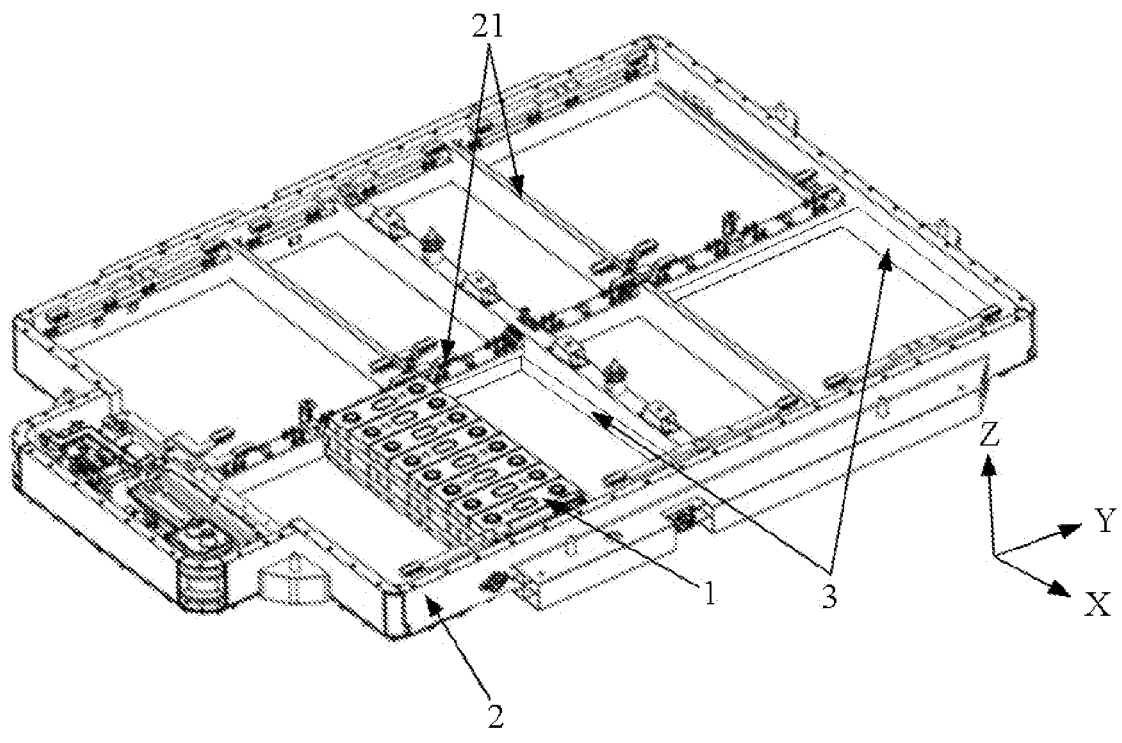
FIG. 3 is a schematic structural diagram of still another battery according to an embodiment of this application.
Figure 4:
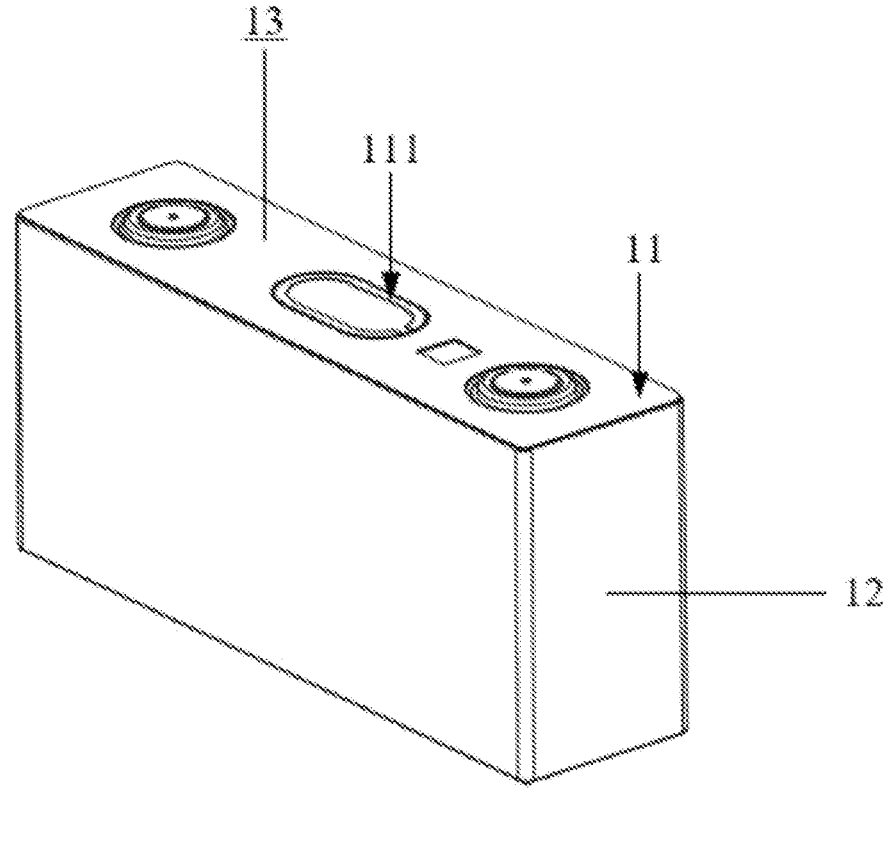
FIG. 4 is a schematic structural diagram of a battery cell according to an embodiment of this application.

FIG. 1 to FIG. 3 are schematic structural diagrams of a battery according to the embodiments of this application. FIG. 4 is a schematic structural diagram of a battery cell 1 according to an embodiment of this application. As shown in FIG. 1 to FIG. 4, the battery includes: a plurality of battery cells 1 arranged in a first direction X, where the battery cell 1 includes a first wall 11 and a second wall 12 that intersect, the first wall 11 is provided with a pressure relief mechanism

111, and the pressure relief mechanism 111 is configured to be actuated when internal pressure or temperature of the battery cell 1 reaches a threshold, so as to relieve the internal pressure of the battery cell 1; a box 2 configured to accommodate the plurality of battery cells 1; and a protective member 3 disposed between the second wall 12 of the battery cell 1 and an inner wall of the box 2, where the protective member 3 is configured to prevent emissions from the battery cell 1 from causing electrical connection between the second wall 12 of the battery cell 1 and the inner wall of the box 2 when the pressure relief mechanism 111 is actuated.

It should be noted that FIG. 1 to FIG. 3 show the Cartesian coordinate system to distinguish between various directions. A coordinate axis X is used to indicate the first direction X, an arrangement direction of the plurality of battery cells 1; a coordinate axis Z is used to indicate a second direction Z; and a coordinate axis Y is used to indicate a third direction Y which is perpendicular to the first direction X and the second direction Z. Under the arrangement of this embodiment, the first direction X is a first horizontal direction and also a width direction of the battery; the second direction Z is in a perpendicular direction and is a height direction of the battery or a height direction of the electric apparatus provided in this application; and the third direction Y is a second horizontal direction and also a length direction of the battery.

The plurality of battery cells 1 in the battery are arranged in the first direction X and accommodated in the box 2 of the battery in the perpendicular direction (that is, in the second direction Z). The plurality of battery cells 1 may be rechargeable secondary batteries, and preferably, the battery cells 1 are lithium-ion batteries. As shown in FIG. 4, the battery cell 1 includes an electrode assembly, a housing, and a top cover assembly 13.

The electrode assembly is a core member of the battery cell 1 for implementing charge and discharge functions. The electrode assembly includes a positive electrode plate, a negative electrode plate, and a separator disposed between the positive electrode plate and the negative electrode plate. The electrode assembly includes a positive tab and a negative tab, where the positive tab extends from a coating area of the positive electrode plate, and the negative tab extends from a coating area of the negative electrode plate. The electrode assembly is located in the housing.

The housing may be made of a metal material or a composite material. As shown in FIG. 4, any one of outer side walls of the housing is equivalent to the second wall 12 of the battery cell 1. In some embodiments, the entire housing may be made of a metal material such as aluminum, aluminum alloy, or nickel plated steel. In some other embodiments, the housing may include a substrate and an insulation layer, where the substrate is made of a metal material such as aluminum, aluminum alloy, or nickel plated steel, and the insulation layer may be disposed on an outer surface of the substrate by coating, bonding, or the like. In this case, the metal substrate can guarantee strength of the housing, and the insulation layer can improve insulation performance of the housing. In addition, the housing may be hexahedral, rectangular, cylindrical, or of any other shapes. The housing has an opening, an accommodating cavity is formed inside the housing, the electrode assembly is placed into the accommodating cavity from the opening, and electrolyte is also injected into the accommodating cavity from the opening.

As shown in FIG. 4, the top cover assembly 13 is equivalent to the first wall 11 of the battery cell 1, and the first wall 11 and the second wall 12 intersect. The top cover assembly 13 includes a top cover plate and two electrode terminals, and the two electrode terminals is disposed on the top cover plate. The top cover plate may be made of a metal material such as aluminum and aluminum alloy, and the top cover plate fits with the opening of the housing in size. The top cover plate may be welded to the housing and cover the opening of the housing, so as to seal the electrode assembly in the housing.

When the battery cell 1 accidentally experiences thermal runaway, the electrode assembly releases a large amount of gas. If the gas is not discharged to the outside of the battery cell 1 in a timely manner, explosion is easily caused. Therefore, to improve safety performance of the battery cell 1, in some embodiments, the top cover assembly 13 may further be provided with a pressure relief mechanism 111, that is, the first wall 11 of the battery cell 1 is provided with a pressure relief mechanism 111, and the pressure relief mechanism 111 may include an explosion-proof valve. The explosion-proof valve is sealedly connected to the top cover plate and covers a degassing hole provided on the top cover plate. The explosion-proof valve is provided with an indentation to form a weak region. When the battery cell 1 is in a normal operating state, the explosion-proof valve seals the degassing hole to avoid electrolyte leakage. When violent gas production of the battery cell 1 due to short circuit or the like causes internal pressure of the battery cell 1 to increase to a specified extent, emissions break through the explosion-proof valve at the weak region and are discharged to the outside of the battery cell 1 through the degassing hole on the top cover plate, so as to relieve the internal pressure of the battery cell 1 and reduce the risk of explosion.

In some embodiments, a distance is provided between the second wall 12 of the battery cell 1 and the inner wall of the box 2, and the distance may be greater than 3 mm (millimeter). Most of emissions from the battery cell 1 are discharged along a discharge channel, and some emissions still fall between the second wall 12 of the battery cell 1 and the inner wall of the box 2. An appropriate distance left between the second wall 12 of the battery cell 1 and the inner wall of the box 2 can provide a large accommodating space for emissions produced by thermal runaway so that the emissions do not easily come into contact with the second wall 12 of the battery cell 1 and the inner wall of the box 2, thereby reducing the probability of electrical connection between the second wall 12 of the battery cell 1 and the inner wall of the box 2 caused by the emissions and reducing the risk of short circuit.

It should be noted that the protective member 3 is configured to prevent emissions from the battery cell 1 from causing electrical connection between the second wall 12 of the battery cell 1 and the inner wall of the box 2 when the pressure relief mechanism 111 is actuated. Therefore, the protective member 3 may be made of an insulation material with high temperature resistance, so that the protective member 3 can ensure insulation between the second wall 12 of the battery cell 1 and the inner wall of the box 2 to avoid the risk of short circuit, and the protective member 3 has high-temperature fire resistance to provide fire prevention without being melted while protecting against the emissions produced by the thermal runaway.

To guarantee the protective effect of the protective member 3, the protective member 3 may be thick enough and high temperature resistant. The protective member 3 in this application is disposed between the second wall 12 of the battery cell 1 and the inner wall of the box 2, not on the first wall 11 where the pressure relief mechanism 111 is located, so that the emissions do not directly impact the protective member 3. Therefore, in some embodiments, the thickness of the protective member 3 may be greater than or equal to 0.1 mm and less than or equal to 1 mm. In some embodiments, the protective member 3 may be an insulation coating layer applied onto the second wall 12 of the battery cell 1 or the inner wall of the box 2, which is not limited in the embodiments of this application.

In some embodiments, a melting point of the protective member 3 may be higher than 100° C. (degrees Celsius). The protective member 3 in the embodiments of this application may be a mica plate (for example, mica paper) or the like, that is, the protective member 3 is made of a mica plate material, so as to satisfy high temperature resistance and insulation requirements. The protective member 3 may alternatively be a ceramic composite belt or the like, which is not limited in the embodiments of this application.

In some embodiments, a size of the protective member 3 in the second direction Z may be greater than or equal to 2 mm and less than or equal to a size of the battery in the second direction Z. This can save materials and reduce costs while guaranteeing the protective effect.

In a specific implementation, when only a small amount of emissions fall between the second wall 12 of the battery cell 1 and the inner wall of the box 2, the size of the protective member 3 in the second direction Z may be set small. For example, the size of the protective member 3 in the second direction Z is equal to 3 mm. However, to guarantee the protective effect of the protective member 3 and effectively reduce the risk of short circuit, the size of the protective member 3 in the second direction Z may be set large. For example, the size of the protective member 3 in the second direction Z may be equal to the size of the battery in the second direction Z. In this way, no matter how high the emissions between the second wall 12 of the battery cell 1 and the inner wall of the box 2 are deposited, the protective member 3 can prevent electrical connection between the second wall 12 of the battery cell 1 and the inner wall of the box 2.

For an arrangement position of the protective member 3, in some embodiments, as shown in FIG. 2, the protective member 3 may be disposed only on the second wall 12 of the battery cell 1.

In some embodiments, as shown in FIG. 3, the protective member 3 may be disposed only on the inner wall of the box 2.

In some embodiments, the protective member 3 may be disposed on both the second wall 12 of the battery cell 1 and the inner wall of the box 2.

In some embodiments, the protective member 3 may include a first protective member and a second protective member that are separated, where the first protective member is fastened to the second wall 12 of the battery cell 1, and the second protective member is fastened to the inner wall of the box 2. The first protective member may be the same as or different from the second protective member, which is not limited in the embodiments of this application.

In some embodiments, the protective member 3 may be fastened to the inner wall of the box 2 by bonding, for example, by using a structural adhesive or an insulation glue. The protective member 3 may be fastened to the second wall 12 of the battery cell 1 by bonding, or as shown in FIG. 2, by using a fastening band 4 which is disposed around the periphery of the plurality of battery cells 1.

In some embodiments, the battery may further include a binder, for example, a structural adhesive or an insulation glue. The binder is used to fasten the plurality of battery cells 1 to the box 2. For example, the battery cells 1 may be fastened to the box 2 by applying the binder to the bottom of the plurality of battery cells 1 and/or by applying the binder to a lower box 2, and disposing the battery cells 1 at appropriate positions in the lower box 2.

When the plurality of battery cells 1 are disposed in the lower box 2, the battery cells 1 will press the lower box 2 down. During the pressing, excess binder between the bottom of the battery cells 1 and the lower box 2 is squeezed to overflow between the second wall 12 of the battery cell 1 and the inner wall of the box 2. Due to insulation of the binder, the binder overflowing between the second wall 12 of the battery cell 1 and the inner wall of the box 2 can also prevent electrical connection between the second wall 12 of the battery cell 1 and the inner wall of the box 2.

Further, to make the overflowing binder effectively prevent electrical connection between the second wall 12 of the battery cell 1 and the inner wall of the box 2, an overflow height of the binder may be not less than a preset value. In other words, a thickness of the binder overflowing between the second wall 12 of the battery cell 1 and the inner wall of the box 2 cannot be too small. For example, the preset value may be any value greater than 2 mm. In some embodiments, the overflow height of the binder may be set based on the distance between the second wall 12 of the battery cell 1 and the inner wall of the box 2. When the distance between the second wall 12 of the battery cell 1 and the inner wall of the box 2 is relatively large, the overflow height of the binder may be set small; or when the distance between the second wall 12 of the battery cell 1 and the inner wall of the box 2 is relatively small, the overflow height of the binder may be set large. The specific overflow height is not limited in the embodiments of this application, provided that the overflowing binder can prevent electrical connection between the second wall 12 of the battery cell 1 and the inner wall of the box 2.

In some embodiments, as shown in FIG. 3, the box 2 of the battery may be provided with a structural beam 21, where the structural beam 21 is configured to separate an inner space of the box 2 into a plurality of accommodating cavities, each of the accommodating cavities is configured to accommodate at least one battery cell 1, and the protective member 3 is disposed between the second wall 12 of the battery cell 1 and a cavity wall of the accommodating cavity.

It should be noted that the box 2 of the battery includes an upper box cover and the lower box 2, where the upper box cover and the lower box 2 may be made of a metal material such as aluminum and aluminum alloy. The structural beam 21 may be disposed in the lower box 2, and may be formed by casting, extruding, profile welding, or the like.

There may be one or more structural beams 21. As shown in FIG. 3, the box 2 is provided with three structural beams 21 in the third direction Y and one structural beam 21 in the first direction X. These four structural beams 21 separate the inner space of the box 2 into eight accommodating cavities, and each of these eight accommodating cavities can accommodate at least one battery cell 1.

The inner wall of the box 2 includes a side wall of the box 2 and a side wall of the structural beam 21 (that is, the cavity wall of the accommodating cavity) in the box 2. Therefore, when the battery cell 1 is accommodated in the accommodating cavity, the protective member 3 may be disposed between the second wall 12 of the battery cell 1 and the side wall of the box 2 or between the second wall 12 of the battery cell 1 and the cavity wall of the accommodating cavity.

The implementation in which the protective member 3 is disposed between the second wall 12 of the battery cell 1 and the cavity wall of the accommodating cavity is applicable to the foregoing related descriptions, and details are not described herein again.

It should be noted that when an accommodating cavity accommodates one battery cell 1, the protective member 3 may be disposed between a second wall 12 of the battery cell 1 and the inner wall of the box 2.

When an accommodating cavity accommodates a plurality of battery cells 1 as a whole, an outer side wall of such a whole is a common second wall 12 of the plurality of battery cells 1, and the protective member 3 may be disposed between the common second wall 12 of the plurality of battery cells 1 and the inner wall of the box 2. In this case, the distance between the second wall 12 of the battery cell 1 and the inner wall of the box 2 is a distance between the common second wall 12 of the plurality of battery cells 1 and the inner wall of the box 2.

To sum up, in the embodiments of this application, the first wall 11 of the plurality of battery cells 1 is provided with the pressure relief mechanism 111, the protective member 3 is disposed between the second wall 12 of the plurality of battery cells 1 and the inner wall of the box 2, and the first wall 11 and the second wall 12 of the plurality of battery cells 1 intersect. In other words, in the embodiments of this application, the pressure relief mechanism 111 and the protective member 3 are disposed on two different walls of the battery cell 1 respectively. In this way, when emissions produced by thermal runaway of a battery are discharged from the pressure relief mechanism 111 disposed on the first wall 11, if the emissions fall between the second wall 12 of the battery cell 1 and the inner wall of the box 2, under the protective effect of the protective member 3, electrical connection between the second wall 12 of the battery cell 1 and the inner wall of the box 2 can be effectively avoided, thereby reducing the risk of short circuit and improving use safety of the battery.

Persons skilled in the art can understand that, although some of the embodiments described herein include some but not other features included in other embodiments, combinations of features of different embodiments are meant to be within the scope of this application and form different embodiments. For example, in the claims, any one of the claimed embodiments may be used in any combination.

In conclusion, the foregoing embodiments are merely intended for describing the technical solutions of this application, but not for limiting this application. Although this application is described in detail with reference to the foregoing embodiments, persons of ordinary skills in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A battery, comprising:
   a plurality of battery cells arranged in a first direction to form a row of battery cells, wherein each battery cell comprises a first wall that faces a second direction, and a second wall that faces a third direction, the first direction, the second direction and the third direction are perpendicular to each other, the first wall is provided with a pressure relief mechanism, and the pressure relief mechanism is configured to be actuated when internal pressure or temperature of the battery cell reaches a threshold, so as to relieve the internal pressure of the battery cell;

a box, configured to accommodate the plurality of battery cells, and an inner wall of the box faces the second walls of the battery cells; and a protective member, disposed between second walls of the battery cells and the inner wall of the box, wherein the protective member is configured to prevent emissions from any of the battery cells from causing an electrical connection between the second wall of the battery cell and the inner wall of the box when the pressure relief mechanism of the battery cell is actuated:

wherein the protective member is a rectangular flat sheet that extends along the first direction in length and along the second direction in width, and a width of the protective member is greater than or equal to 2 millimeters and less than or equal to a height of the battery cells in the second direction.

2. The battery according to claim 1, wherein the protective member is fastened to the second walls of the battery cells and/or the inner wall of the box.

3. The battery according to claim 2, wherein the protective member is bonded to the second walls of the battery cells and/or the inner wall of the box.

4. The battery according to claim 2, wherein the battery further comprises a fastening band, wherein the fastening band is disposed around the periphery of the plurality of battery cells, and the fastening band is configured to fasten the protective member to the second walls of the battery cells.

5. The battery according to claim 2, wherein the protective member comprises a first protective member and a second protective member that are separated, wherein the first protective member is configured to be fixedly connected to the second walls of the battery cells, and the second protective member is configured to be fixedly connected to the inner wall of the box.

6. The battery according to claim 1, wherein the protective member is an insulation coating layer applied onto the second walls of the battery cells and/or the inner wall of the box.

7. The battery according to claim 1, wherein the box is provided with a structural beam, wherein the structural beam is configured to separate an inner space of the box into a plurality of accommodating cavities, each of the accommodating cavities is configured to accommodate at least one battery cell, and the protective member is disposed between the second wall of the battery cell and a cavity wall of the accommodating cavity.

8. The battery according to claim 1, wherein a thickness of the protective member is greater than or equal to 0.1 millimeter and less than or equal to 1 millimeter.

9. The battery according to claim 1, wherein a melting point of the protective member is higher than 100° C.

10. The battery according to claim 1, wherein a distance between the second walls of the battery cells and the inner wall of the box is greater than 3 millimeters.

11. The battery according to claim 1, wherein the battery further comprises:

a binder for fastening the plurality of battery cells to the box, wherein at least part of the binder is located between the second walls of the battery cells and the inner wall of the box, so as to prevent emissions from any of the battery cells from causing electrical connection between the second walls of the battery cells and the inner wall of the box.

12. The battery according to claim 11, wherein a thickness of the at least part of the binder located between the second walls of the battery cells and the inner wall of the box is greater than 2 millimeters.

13. An electric apparatus, comprising the battery according to claim 1, wherein the battery is configured to supply electric energy.

\* \* \* \* \*